(12) United States Patent
Lu

(10) Patent No.: US 6,904,165 B2
(45) Date of Patent: Jun. 7, 2005

(54) COLOR IMAGE PROCESSING APPARATUS AND METHOD FOR COLOR ENHANCEMENT

(75) Inventor: Chung-Yen Lu, Taipei (TW)

(73) Assignee: Silicon Integrated Systems Corporation, Hsinchu (TW)

(*) Notice: Subject to any disclaimer, the term of this patent is extended or adjusted under 35 U.S.C. 154(b) by 633 days.

(21) Appl. No.: 09/924,622

(22) Filed: Aug. 8, 2001

(65) Prior Publication Data

US 2003/0068080 A1 Apr. 10, 2003

(51) Int. Cl.[7] .................................................. G06K 9/00
(52) U.S. Cl. ...................... 382/162; 382/254; 358/3.27; 358/447
(58) Field of Search ............................... 382/162, 167, 382/169, 254, 270, 274; 345/589–591, 610, 617; 348/254–256; 358/3.27, 447, 461, 516–521

(56) References Cited

U.S. PATENT DOCUMENTS

| | | | | |
|---|---|---|---|---|
| 5,016,173 A | * | 5/1991 | Kenet et al. | 382/128 |
| 5,241,468 A | * | 8/1993 | Kenet | 600/300 |
| 5,548,697 A | * | 8/1996 | Zortea | 706/2 |
| 5,883,984 A | * | 3/1999 | Huang et al. | 382/274 |
| 5,905,504 A | * | 5/1999 | Barkans et al. | 345/597 |

FOREIGN PATENT DOCUMENTS

JP          2001054132 A    *   2/2001    ............ H04N/9/64

OTHER PUBLICATIONS

Machine translation of JP 2001054132 A cited above.*

* cited by examiner

Primary Examiner—Bhavesh M. Mehta
Assistant Examiner—Yubin Hung
(74) Attorney, Agent, or Firm—Snell & Wilmer L.L.P.

(57) ABSTRACT

An apparatus and method for pixel color enhancement are provided. The preferred embodiment includes a first circuitry, a second circuitry, a third circuitry, a fourth circuitry. In a preferred embodiment, the apparatus further includes a fifth circuitry. The first circuitry determines and outputs a reference value X. The second circuitry inputs the X, and (R, G, B) and subtracts X from three components (R, G, B) respectively to obtain values of (R–X), (G–X) and (B–X). The third circuitry inputs values of (R–X), (G–X) and (B–X) and scale values of (R–X), (G–X) and (B–X) by a factor S to generate values of S*(R–X), S*(G–X) and S*(B–X). The fourth circuitry 16 respectively adds values of S*(R–X), S*(G–X) and S*(B–X) to three components (R, G, B) to generate three enhanced components (R', G', B').

1 Claim, 2 Drawing Sheets

COLOR IMAGE PROCESSING APPARATUS AND METHOD FOR COLOR ENHANCEMENT

BACKGROUND OF THE INVENTION

1. Field of the Invention

The present invention relates to color image processing techniques and more particularly, to a color image processing apparatus and method thereof for color enhancement.

2. Description of the Related Art

The HSV (hue, saturation, value), or HSB (hue, saturation, brightness) model was proposed by A. R. Smith (1978) to facilitate a more intuitive interface for color than the selection of three primary colors model, i.e. R, G, and B. The color space has the shape of a hexagonal cone. The HSV cone is a non-linear transformation of the RGB cube and it is referred to as a perceptual model. 'Perceptual' means the attributes that are more akin to the way in which human-beings think of color. 'Perceptual' does not mean that the color space is perceptually linear. The perceptual non-linearity of RGB space is carried over into HSV space. In particular, the perceptual changes in hue are non-linear with respect to the angle change.

HSV model can be employed in any context where a user requires control or selection of a color on an aesthetic or similar basis. HSV model enables control over the range or gamut of an RGB monitor using the perceptually based variables, i.e. hue, saturation and value/brightness. This means that a user interface can be constructed easily and predictably by varying one of three parameters. An operation, such as making color X brighter, paler or more yellow, is far easier, when these perceptual variables are employed, than deciding on what combinations of RGB changes to be made.

The HSV model is based on polar coordinates (r, e, z) rather than Cartesians coordinates. Hue, or tint or tone, is represented as an angle about the z axis, ranging from 0° through 360°. Vertices of the hexagon are separated by 60° increment. Red is at H=0°, Yellow at H=60°, Green at H=120°, and Cyan at H=180°. Complementary colors are 180° spaced apart from each other.

Distance from the z axis represents Saturation (S): the amount of color present. S varies from 0 to 1. It is represented in this model as the ratio of the purity of a hue. S=1 represents maximum purity of this hue. A hue is said to be one-quarter purity at S=0.25. At S=0, the gray scale is resulted.

V, value of HSV, varies from 0 at the apex of the hexcone to 1 at the bottom of the hexcone. V=0 represents blackness. With V=1, color has his maximum intensity. When V=1 and S=1, we have the pure hue. Whiteness is obtained at the location of V=1 and S=0.

If adjustment of HSV color parameters, H, S, V, are made available to a user of a graphics utility, these parameters are transformed to the RGB setting needed for controlling of the RGB color monitor. To determine the operations needed in this transformation, we recite the well known algorithm in the following about how the HSV hexcone is derived from the RGB cube.

The diagonal from black (the origin) to white of the RGB cube corresponds to the z axis of the HSB hexcone. Each subcube of the RGB cube corresponds to a hexagonal cross-sectional area of the HSB hexcone. At any cross section, all sides of the HSB hexagon and all radial lines from the z axis to any vertex have same V, value. For any set of RGB values, V is equal to the maximum value in this set. The HSB point corresponding to the set of RGB value lies on the hexagonal cross section having value of V. S, Saturation of HSV, is determined as the relative distance of the location of the point from z axis. H, hue of HSV, is determined by calculating the relative position of the point within each sextant of the HSB hexagon. A well known algorithm for mapping set of RGB value into the corresponding HSV value is given in the following procedure (written with C language).

```
#include <math.h>
#define MIN(a, b) (a<b?a:b)
#define MAX(a, b) (a>b?a:b)
#define NO_HUE - 1
void rgbToHsv(float r, float g, float b, float* h, float* s, float* v) {
    float max = MAX(r, MAX(g, b));
    float min = MIN(r, MIN(g, b));
    float delta = max - min;
    *v = max;
    if(max != 0.0) *s = delta/max;
    else *s= 0.0;
    if (*s==0.0) *h = NO_HUE;
    else {
        if (r==max)    *h = (g-b)/delta;
        else if (g==max)  *h = 2 + (b-r)/delta;
        else if (b==max)  *h = 4 + (r-g)/delta;
        *h *= 60.0;
        if(*h<0) *h += 360.0;
        *h /= 360.0;
    }
}
```

Let max be the maximum value of red, green, blue color components. Let min be the minimum value of red, green, blue color components. Let delta equal to (max−min). According to HSV model, the saturation is defined as delta/max.

For a specific pixel, suppose the corresponding color components have the relation of R>G>B. Then the color hue angle is denoted as θ, where $$\theta = 60° * \frac{(G-B)}{(R-B)}.$$

And the color saturation is denoted as Ω, where $$\Omega = \frac{(R-B)}{R}.$$

SUMMARY OF THE INVENTION

It is an objective of the present invention to provide a color image enhancement method and device for computer graphics and video applications.

It is yet another objective of the present invention to adjust the saturation of a pixel of the computer graphics without making change to the color hue.

An apparatus and method for pixel color enhancement are provided. The preferred embodiment includes a first circuitry, a second circuitry, a third circuitry, a fourth circuitry. In a preferred embodiment, the apparatus further includes a fifth circuitry. The first circuitry determines and outputs a reference value X. The second circuitry inputs the X, and (R, G, B) and subtracts X from three components (R, G, B) respectively to obtain values of (R−X), (G−X) and (B–X). The third circuitry inputs values of (R–X), (G–X) and (B–X) and scale values of (R–X), (G–X) and (B–X) by a factor S to generate values of S*(R–X), S*(G–X) and S*(B–X). The fourth circuitry 16 respectively adds values of S*(R–X), S*(G–X) and S*(B–X) to three components (R, G, B) to generate three enhanced components (R', G', B').

Advantages and spirit of the present invention can be further understood by the following detailed description of the invention and drawings.

DETAILED DESCRIPTION OF THE INVENTION

Figure 1:
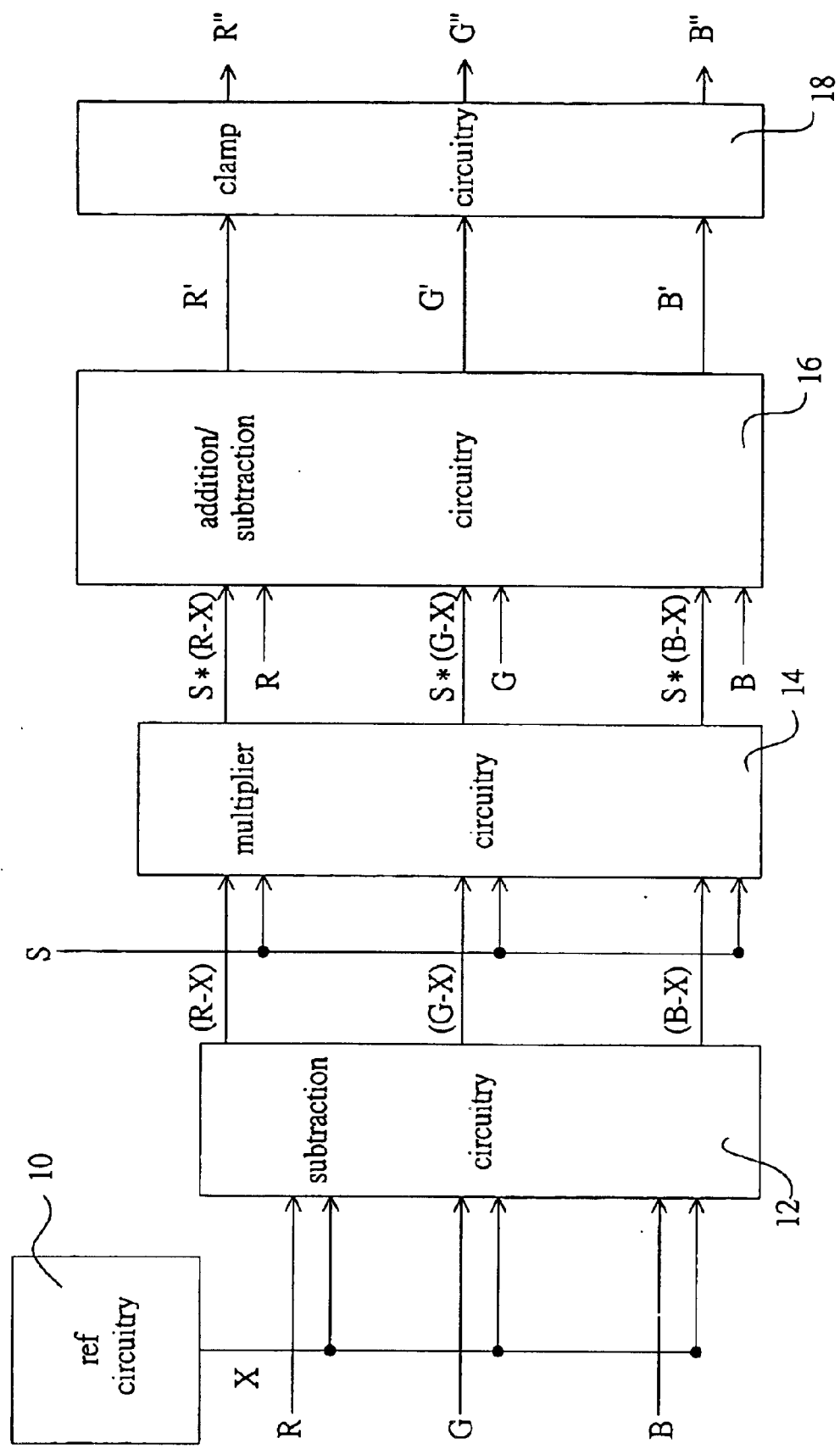
FIG. 1 shows a preferred embodiment of invention.

For color enhancement purpose, we wants to preserve color hue with increased saturation. A method is introduced by the instant invention to enhance color by following equation (1).

$$\begin{cases} R_{new} = R + (R - X) * \text{Scale} \\ G_{new} = G + (G - X) * \text{Scale} \\ B_{new} = B + (B - X) * \text{Scale} \end{cases} \quad (1)$$

In equation (1), X could be any value within the range of R, G, B values, and Scale is a scaling factor chosen. The enhanced color have red component, $R_{new}$, green component, $G_{new}$ and blue component, $B_{new}$. As Scale is positive, the saturation is enhanced, as Scale is negative, the saturation is degraded, and if Scale is zero, there is no change of saturation.

Suppose Scale be positive, due to the characteristic of linear scaling, $R_{new} > G_{new} > B_{new}$ as R>G>B is assumed for a particular pixel. And the red component is still the maximum value among the components. The new color hue angle of the enhanced color is denoted as $\theta_{new}$, and it is proven by the following derivation that $\theta_{new}$ is same as θ. That is, color hue is unchanged by the enhancement provided by Equation (1).

$$\theta_{new} = 60° * \frac{(G_{new} - B_{new})}{(R_{new} - B_{new})} = 60° * \frac{(G - B)}{(R - B)} = \theta$$

According to above description, the new saturation $\Omega_{new}$ is shown in the following equation.

$$\Omega_{new} = \frac{(R_{new} - B_{new})}{R_{new}}$$

One may prove by the following derivation that the saturation of color is enhanced as (R–B≥0). The purpose of the invention is achieved by Equation (1) provided by the invention.

$$\Omega_{new} - \Omega = \frac{(R_{new} - B_{new})}{R_{new}} - \frac{(R - B)}{R}$$
$$= \frac{R_{new} * B - R * B_{new}}{R_{new} * R}$$
$$= \frac{[R + (R - X) * \text{Scale}] * B - R * [B + (B - X) * \text{Scale}]}{R_{new} * R}$$

$$= \frac{-B * X * \text{Scale} + R * X * \text{Scale}}{R_{new} * R}$$
$$= \frac{X * \text{Scale} * (R - B)}{R_{new} * R} \geq 0$$

Based on above description, the color hue is kept unchanged while the color saturation is enhanced with the approach by Eq. (1) proposed by the invention.

Instead of a predetermined constant X used in equation (1), the second embodiment of the invention provides the color enhancement process in RGB color space by the following equations:

$$\begin{cases} R_{new} = R + (R - f(R, G, B)) * \text{Scale} \\ G_{new} = G + (G - f(R, G, B)) * \text{Scale} \\ B_{new} = B + (B - f(R, G, B)) * \text{Scale} \end{cases} \quad (2)$$

where R, G and B are original color components, $R_{new}$, $G_{new}$ and $B_{new}$ are enhanced color components, Scale is the degree of enhancement, and f(R, G, B) is a function of variables R, G and B.

In a preferred embodiment, f(R, G, B) is min(R, G, B) which is the minimum value of R, G and B. When this is implemented, the equations for color enhancement are:

$$\begin{cases} R_{new} = R + (R - \min(R, G, B)) * \text{Scale} \\ G_{new} = G + (G - \min(R, G, B)) * \text{Scale} \\ B_{new} = B + (B - \min(R, G, B)) * \text{Scale} \end{cases} \quad (3)$$

Alternatively, f(R, G, B) is max(R, G, B) which is the maximum value of R, G and B. Or, alternatively, f(R, G, B) is middle value of R, G and B. Or, alternatively, f(R, G, B) is mean (average) value of R, G and B. It may be proved without difficulty that the color hue is kept unchanged while the color saturation is enhanced with the approach by Equation (2) or Equation (3) proposed by the invention.

Since the enhancement process recited above may cause the enhanced components exceeding a corresponding upper limit for each component, the clamp operations are required to prevent the overflow. The clamp operation limits the value of the components to the corresponding upper limit when it is exceeded by the enhanced component value.

As illustrated in FIG. 1, the apparatus of the present invention includes a first circuitry 10, a second circuitry 12, a third circuitry 14, a fourth circuitry 16. In a preferred embodiment, the apparatus further includes a fifth circuitry 18. The color enhancement process is used to adjust original images in RGB color space by a scale factor to form the enhanced images. The process processes each pixel on the RGB color space and does not need the color model conversion.

The first circuitry 10 determines and outputs a reference value X. The second circuitry 12 inputs the X, and (R, G, B) and subtracts X from three components (R, G, B) respectively to obtain values of (R–X), (G–X) and (B–X) at the outputs thereof.

The third circuitry 14 inputs values of (R–X), (G–X) and (B–X) and scale values of (R–X), (G–X) and (B–X) by a factor S to generate values of S*(R–X), S*(G–X) and S*(B–X). The fourth circuitry 16 respectively adds values of S*(R–X), S*(G–X) and S*(B–X) to three components (R, G, B) to generate three enhanced components (R', G', B').

Since the enhancement process recited above may cause the enhanced components (R', G', B') exceeding a corresponding upper limit for each component, the fifth circuitry 18 is provided to perform the clamp operations to prevent the overflow of component values. The clamp operation provided by fifth circuitry 18 limits the value of the color components to the corresponding upper limit when it is exceeded by the enhanced component value. The output of the fifth circuitry 18 is (R", G", B").

As the approach of minimum approach shown in Equation (3) is adopted and under the assumption of R>G>B, the equation (3) is simplified as:

$$\begin{cases} R_{new} = R + (R - B)) * \text{Scale} \\ G_{new} = G + (G - B)) * \text{Scale} \\ B_{new} = B \end{cases} \quad (4)$$

Figure 2:
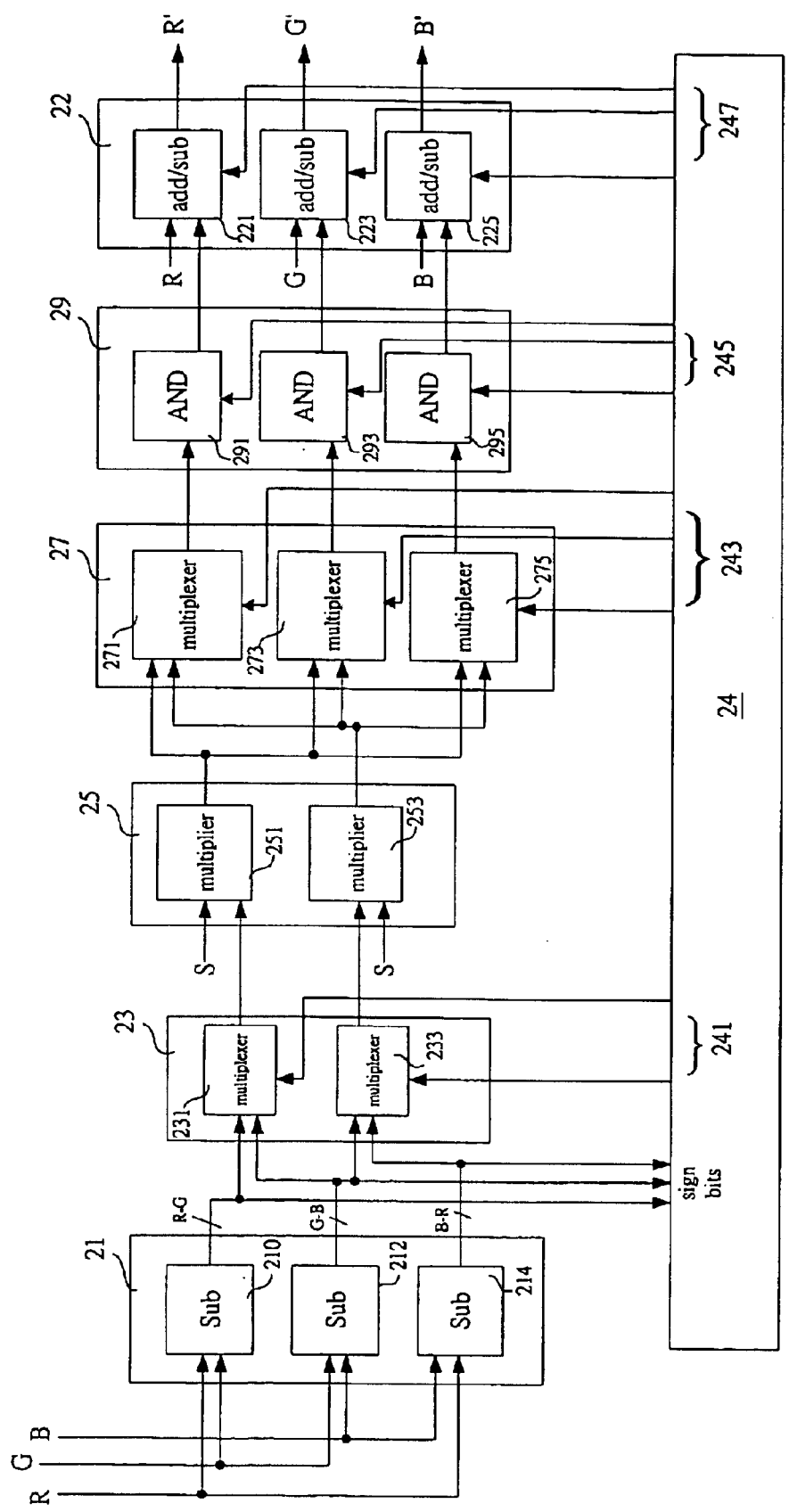
FIG. 2 shows anther preferred embodiment of invention.

A preferred embodiment for implementing the function of Equation (4) is shown in FIG. 2.

The apparatus shown in FIG. 2 includes a first circuitry 21, a first multiplexer unit 23, a multiplier unit 25, a second multiplexer unit 27, a AND logic unit 29, an arithmetic unit 22, and a controller 24.

The first circuitry 21 inputs the R, G, B values and respectively calculates and outputs values of (R–G), (G–B) and (B–R). In a preferred embodiment, the first circuitry 21 includes three subtraction units 210, 212, 214. The sign bits of (R–G), (G–B) and (B–R) are input to the controller 24.

The first multiplexer unit 23, coupled to the first circuitry 21 and responsive to a first selection signal 241, selectively outputs two values of (R–G), (G–B) and (B–R) according to a first predetermined manner. In a preferred embodiment, the first multiplexer unit 23 includes a first multiplexer 231 and a second multiplexer 233. Therefore, the first multiplexer 231 outputs either (R–G) or (G–B) and the second multiplexer 233 outputs either (B–R) or (G–B). Now for illustrative purpose we assume R>G>B for a pixel and f(R, G, B) is min(R, G, B).

Based on the assumption of illustration example, the sign bits which the controller 24 receives are (0, 0, 1). Using these sign bits, the controller 24, either through a look-up table or logic circuit thereof, outputs value of (1, 1) on the first selection signal 241. Under the assumption, the first multiplexer 231 outputs value of (G–B) and the second multiplexer 233 outputs value of (B–R).

The multiplier unit 25, coupled to the first multiplexer unit 23, selectively generates two scaled values of S*(R–G), S*(G–B) and S*(B–R), wherein S is a predetermined scale factor. In a preferred embodiment, the multiplier unit 25 includes a first multiplier 251 and a second multiplier 253. Under the above assumption, the first multiplier 251 outputs value of S*(G–B) and the second multiplier 253 outputs value of S*(B–R).

The second multiplexer unit 27, coupled to the multiplier unit 25 and responsive to a second selection signal 243, selectively outputs the value of S*(R–G), S*(G–B) and S*(B–R). In a preferred embodiment, the second multiplexer unit 27 includes a first multiplexer 271, a second multiplexer 273, a third multiplexer 275. Using the sign bits, the controller 24, either through a look-up table or logic circuit thereof, outputs value of (1, 0, 1) on the second selection signal 243. Under the assumption for the illustration example, the first multiplexer 271 outputs value of S*(B–R), the second multiplexer 273 outputs value of S*(G–B) and the third multiplexer 273 outputs value of S*(B–R).

The AND logic unit 29, coupled to the second multiplexer unit 27 and responsive to a first control signal 245, selectively outputs a set signal of (S*(B–R), S*(G–B), 0), (S*(R–G), 0, S*(G–B)) and (0, S*(R–G), S*(B–R)). In a preferred embodiment, the AND logic unit 29 includes a first AND unit 291, a second AND unit 293 and a third AND unit 295. Under the above assumption for the illustrative example, the controller 24, responsive to the information of sign bits, generates values of (1, 1, 0) for the first control signal 245. Responsive to these value, the first AND unit 291 outputs value of S*(B–R), the second AND unit 293 outputs value of S*(G–B) and the third AND unit 295 outputs 0.

The arithmetic unit 22, coupled to the AND logic unit 29 and inputting the three components (R, G, B), and selectively outputs an enhanced color components of (R+S*(R–B), G+S*(G–B), B), (R+S*(R–G), G, B+S*(B–G)) and (R, G+S*(G–R), B+S*(B–R)), responsive to a second control signal 247. In a preferred embodiment, the arithmetic unit 22 includes a first addition/subtraction unit 221, a second addition/subtraction unit 223 and a third addition/subtraction unit 225. Under the above assumption for illustrative example, the controller 24, responsive to the sign bits, generates values of (1, 0, 0) for the second control signal 247. In response, the first addition/subtraction unit 221 outputs (R+S*(R–B), the second addition/subtraction unit 223 outputs G+S*(G–B) and the third addition/subtraction unit 225 outputs B.

The above detailed description is to clearly describe features and spirit of the present invention and is not intended to limit the scope of the present invention. Various changes and equivalent modifications should be covered by the invention. Therefore, the scope of the present invention should be interpreted based on the following claims together with the above descriptions in the broadest way.

What is claimed is:

1. An apparatus for enhancing pixel color having three components (R, G, B) respectively corresponding to the primary colors of Red, Green and Blue, comprising:

a first circuitry for respectively calculating and outputting values of (R–G),(G–B) and (B–R);

a first multiplexer circuitry, coupled to the first circuitry and responsive to a first selection signal, for selectively outputting two values of (R–G), (G–B) and (B–R) according to a first predetermined manner;

a multiplier circuitry, coupled to the first multiplexer circuitry, for selectively generating two scaled values of S*(R–G), S*(G–B) and S*(B–R), wherein S is a predetermined scale factor;

a second multiplexer circuitry, coupled to the multiplier circuitry and responsive to a second selection signal, for selectively outputting the S*(R–G), S*(G–B) and S*(B–R);

an AND logic circuitry, coupled to the second multiplexer circuitry and responsive to a first control signal, for selectively outputting a set signal of (S*(B–R), S*(G–B), 0), (S*(R–G), 0, S*(G–B)) and (0, S*(R–G), S*(B–R)); and an arithmetic circuitry, coupled to the AND logic circuitry and inputting the three components (R, G, B), for selectively outputting an enhanced color components of (R+S*(R–B), G+S*(G–B), B), (R+S*(R–G), G, B+S*(B–G)) and (R,G+S*(G–R), B+S*(B–R)), responsive to a second control signal.

* * * * *